United States Patent
Leheny et al.

[11] 3,719,423
[45] March 6, 1973

[54] METHOD OF DETERMINING THE PRESENCE OF STIMULATED EMISSION OR OF MEASURING THE NET GAIN IN MATERIALS FOR LASERS

[75] Inventors: Robert Francis Leheny, Little Silver; Kerry Lee Shaklee, Sea Bright, both of N.J.

[73] Assignee: Bell Telephone Laboratories, Incorporated, Murray Hill, N.J.

[22] Filed: Feb. 3, 1971

[21] Appl. No.: 112,237

[52] U.S. Cl. .................... 356/36, 356/85, 356/256
[51] Int. Cl. .............................................. G01n 21/00
[58] Field of Search ..... 250/71 R; 356/36, 74, 85, 86, 356/96, 97, 98; 331/94, 5

[56] References Cited

OTHER PUBLICATIONS

Basov et al.: Soviet Physics, Doklody, Vol. 10, No. 4, Oct. 1965, pages 343 and 344.
Benoit a La Guillaume et al.: Physical Review, Vol. 177, No. 2, Jan. 10, 1969, pages 567–580.

*Primary Examiner*—Ronald L. Wibert
*Assistant Examiner*—F. L. Evans
*Attorney*—R. J. Guenther and Arthur J. Torsiglieri

[57] ABSTRACT

A method of determining the presence of stimulated emission or of measuring the net gain in materials, typically solid materials for lasers, is disclosed. Basically, the technique involves pumping the material to be tested with a beam of radiation to excite a volume therein of variable length, $l$, and comparing the luminescent output emitted along the length, $l$, and from an edge of the excited volume, for various values of $l$. If the output varies approximately as an increasing exponential function of the length, an excess of gain over loss is being obtained. A net gain calculation for the material is then straightforward.

8 Claims, 6 Drawing Figures

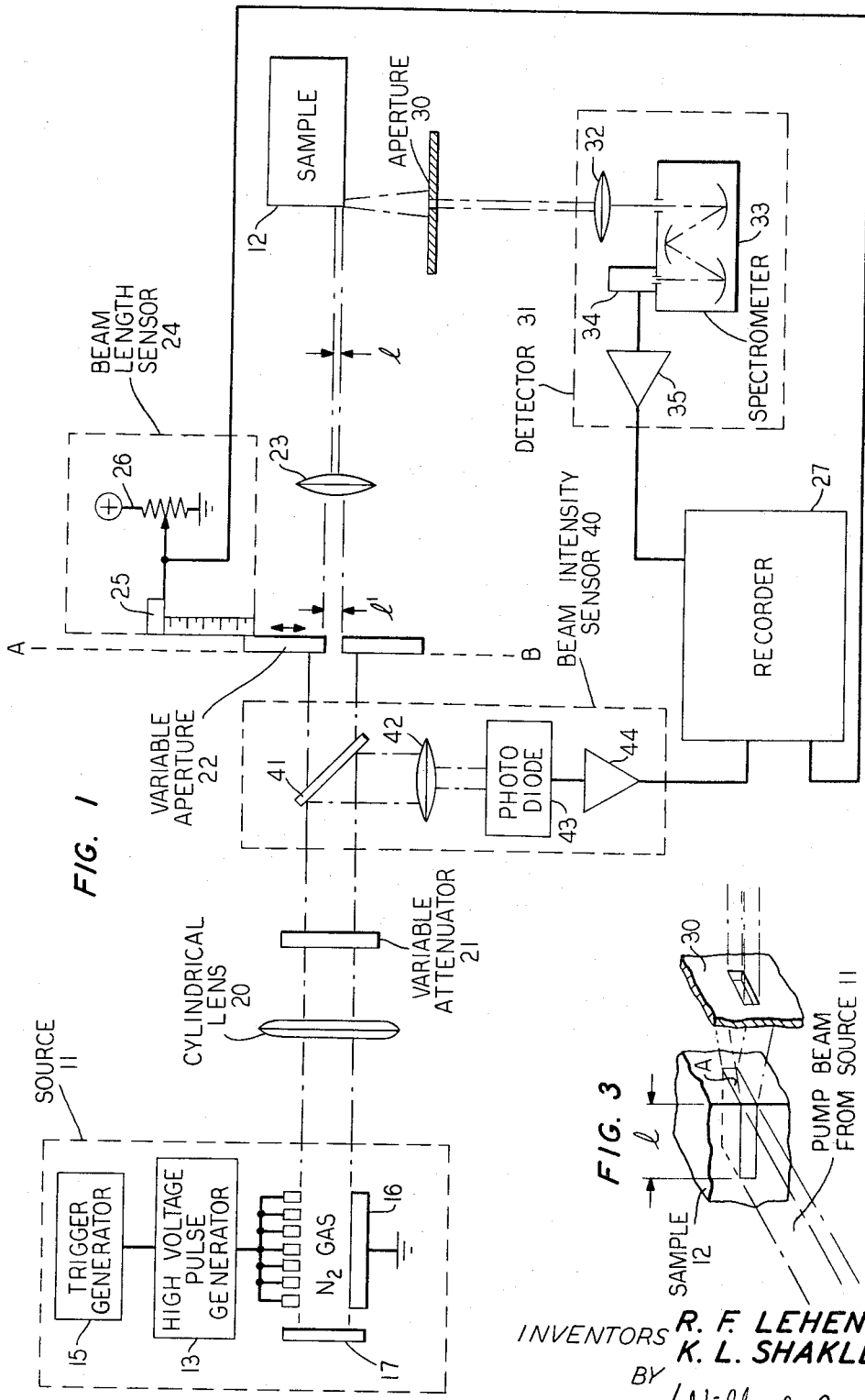

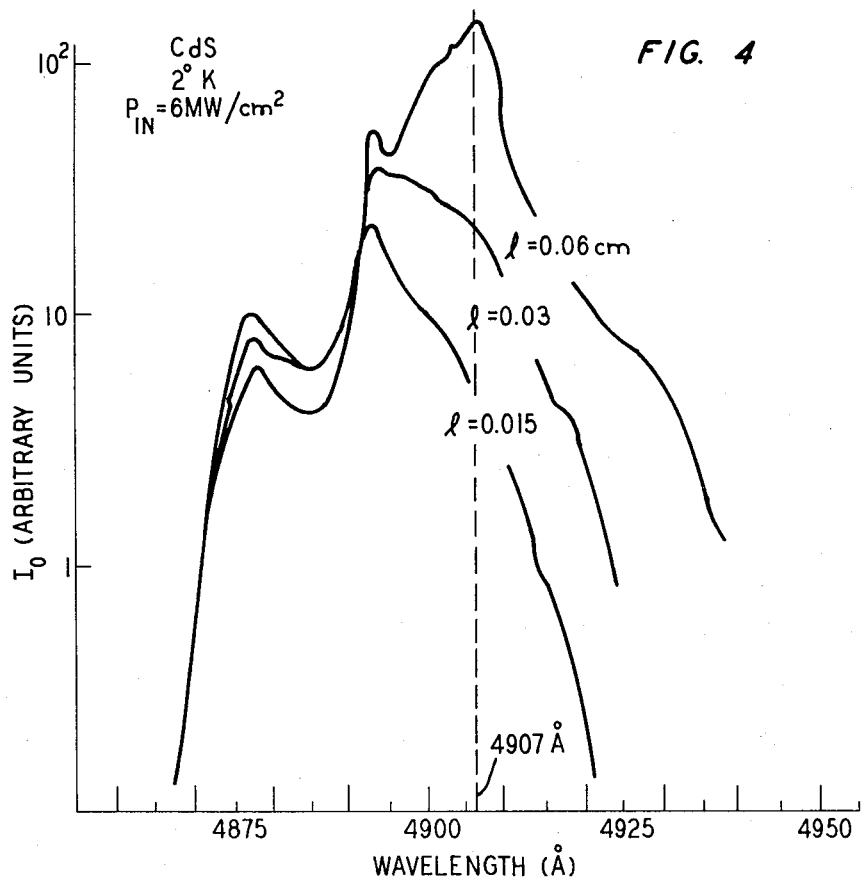

METHOD OF DETERMINING THE PRESENCE OF STIMULATED EMISSION OR OF MEASURING THE NET GAIN IN MATERIALS FOR LASERS

BACKGROUND OF THE INVENTION

This invention relates to testing and measuring techniques useful in the laser art.

Although the basic theories of lasers have well matured since the early development of the laser art, a complete practical understanding of the devices has been hampered by the numerous parameters and conditions which affect the various laser operations.

Many proposals setting forth necessary conditions for efficient laser operation in materials have been previously described. For example, necessary specifications of carrier concentration, crystallinity, and purity in semiconductor samples for lasers can be made in most cases. Nevertheless, a sufficient criterion responsible for lasing in the majority of materials has yet to be recognized.

Because of the lack of this criterion, methods of evaluating materials and mediums for lasers tend to be speculative. Most methods involve selecting the materials with certain necessary conditions, then actually fabricating them into laser elements or inserting them into laser apparatus to determine whether or not suitable gain can be achieved. Fabrication procedures can be tedious and time consuming and in general, testing has been hampered by poor reproducibility and reliability of the results obtained.

To illustrate, reference is again made to semiconductor laser samples. There, fabrication into laser elements involves the forming of diodes in the samples, applying contacts and finally constructing a suitable optical resonator about the samples with appropriate reflectivity. Gain measurements are then determined from the variation of the threshold current with the diode length. This method of evaluating semiconductor samples is not only time consuming but also requires the fabrication of laser elements with identical optical and electrical properties.

It is therefore desirable to have a method of predicting laser potential in various materials before fabrication into lasers.

Measurements of gain in semiconductor samples of cadmium sulfide (CdS), have been previously made without the formation of a resonator about the samples or of a diode therein. This technique was described by Claude Benoit a la Guillaume, Jean-Marie Debever, and Frank Salvan in an article entitled "Radiative Recombination in Highly Excited CdS", which appeared in *Physical Review*, Volume 177, No. 2, Jan. 10, 1969. Briefly, it involved exciting the samples to be tested by electron bombardment and comparing the spontaneous and stimulated output spectra from the excited volume. Separate measurements of the spontaneous and stimulated emission spectra were required and from a graphical analysis thereof gain coefficients for the samples were calculated. The method was not only indirect, but required measurements of both output spectra with identical excitation conditions. This presented an additional problem since adequate control of the excited volume in the samples using electron beam pumping was not possible.

SUMMARY OF THE INVENTION

According to our invention, the presence of stimulated emission or net gain in materials for lasers can be determined directly, with little or no fabrication of the materials required.

Basically, the technique involves pumping the material to be tested with a beam of radiation to excite a volume therein of variable length, $l$, and comparing the intensity of the luminescent output emitted along the length, $l$, and from an edge of the excited volume, for various values of $l$. The presence of stimulated emission is determined from an exponential increase in the intensity as the length of the excited volume is varied.

According to another feature of the invention, the net gain for the material is determined from the rate of increase in the logarithm of the intensity of the luminescent output as the length of the excited volume is varied.

The method is applicable to most materials provided sufficient density of excitable centers therein can be pumped to produce a reasonably detectable output. Preferable materials for testing are solids, including semiconductors and insulators, pure or doped, and metals. Some liquids and other solutions, and high-density, high-pressure gases or vapors may also be tested.

The method has the advantage that materials may be tested before fabrication into lasers. For example, the technique permits evaluation of semiconductor samples as grown without requiring the formation of a resonator about the samples or diodes therein. It therefore offers savings in time and effort and allows evaluation of samples even at a point where fabrication into lasers is not technically feasible.

Further, from the net gain measurements determined according to a feature of our invention, temperature, pumping power intensity, wavelength and other variations of the net gain can be determined directly. Such measurements can be used to obtain optimum specifications of the numerous parameters affecting efficient laser operation.

The technique should also be useful in research for studying the physics of gain processes in materials at an early stage of their technological development. Determinations made according to our invention can be used to test the predictions of various models for describing lasers, providing information over an entire spectral range.

In addition, the technique may be highly desirable for use during the large-scale manufacture of lasers. Because the method permits evaluation of a large number and class of materials with little or no preparation and without damage thereto, it may provide a relatively simple means of monitoring laser samples in the production line.

BRIEF DESCRIPTION OF THE DRAWINGS

A more complete understanding of the foregoing and other features and advantages according to our invention can be obtained from the following detailed description with reference to the accompanying drawings in which:

FIG. 1 is a partially pictorial, partially schematic illustration of apparatus useful in carrying out the method of our invention;

FIG. 2 is a block diagram of the method of our invention employed in operating the apparatus of FIG. 1;

FIG. 3 is a close-up view of sample 12 from FIG. 1 useful in explaining the principles of our invention;

FIG. 4 shows a plot of the intensity of the luminescent output versus wavelength from cadmium sulfide samples, which plot was obtained employing the illustrated apparatus of FIG. 1;

DETAILED DESCRIPTION OF THE PREFERRED METHODS

Figure 6:
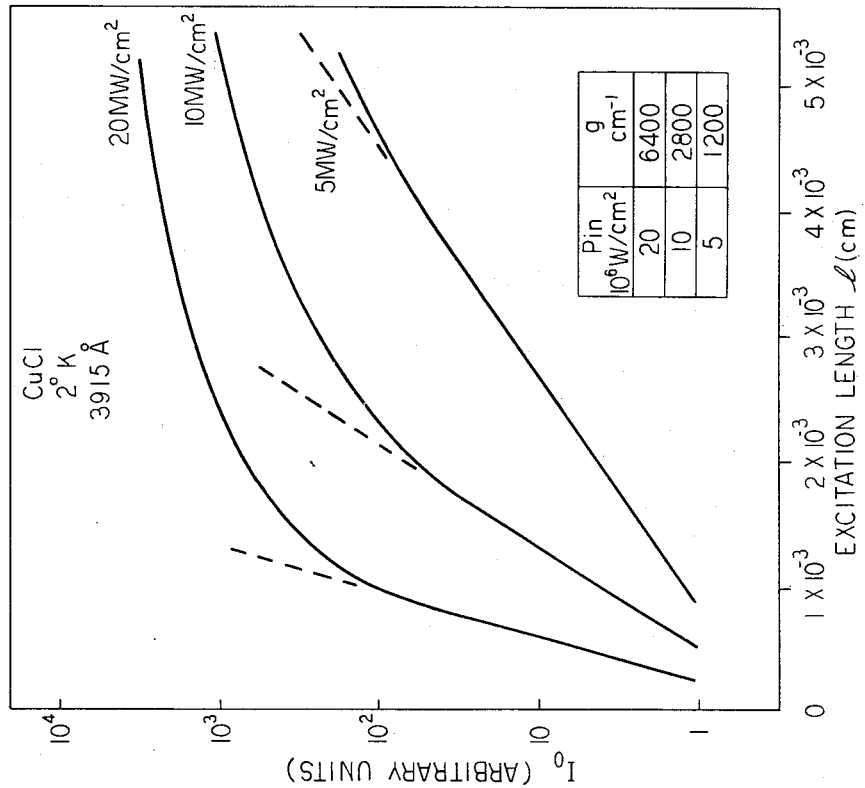
FIG. 6 illustrates a plot of the intensity of the luminescent output versus the excitation length, $l$, for cuprous chloride, from which plot the net gain for cuprous chloride is determined.

A preferred method for carrying out our invention is now described with reference to the illustration of FIG. 1 in which the high intensity radiation source 11 supplies pumping radiation to the sample 12 of the material to be tested.

Briefly, after focusing by cylindrical lens 20 and attenuation by variable attenuator 21, the intensity of the beam is sensed by apparatus 40 and the length, $l'$, of its longest cross-sectional dimension is sensed by apparatus 24 before it falls on sample 12, $L'$ being proportional to the corresponding cross-sectional dimension, $l$, at the sample. Aperture 30 selects and detector 31 measures the total luminescent output traveling essentially in the direction of the long dimension. Comparison of the relative outputs for different values of $l$ is facilitated by recorder 27, which may respond to detector 31, beam length sensor 24, and beam intensity sensor 40.

In the illustration of FIG. 1, as described, the sample 12 is disposed in the path of radiation from source 11 so that the rectangular beam therefrom terminates on an edge of the surface being studied. Output radiation from this edge emitted along the length, $l$, of the excited volume is then appropriately detected. Alternatively, small scribe marks or scratches may be made on the surface of solid samples to be tested and the beam focused to terminate on an edge of one of these scribes or scratches. The output radiation is coupled out at this edge and then detected and monitored as described hereinabove.

The source 11 is illustratively a pulsed nitrogen laser basically of the type disclosed in U.S. Pat. No. 3,543,179, to J. Wilson, issued Nov. 24, 1970. It includes the high voltage pulse generator 13 connected in a low inductance parallel circuit to the transverse segmented electrode 14. Trigger generator 15 periodically provides controlled trigger pulses to the pulse generator 13 to allow high voltage, high current pulses to travel to the segmented electrode 14. Electrode 16 is typically grounded.

The high voltage transverse discharge of the nitrogen laser above-described can cause laser level inversion of the molecular nitrogen plasma between electrodes 14 and 16 and the spontaneous emission of radiation everywhere throughout the discharge region. Excited in this manner, the radiation can have sufficient optical gain to produce a superradiant output beam, the word "superradiant" indicating highly amplified spontaneous emission. Because of their inherently high gain, lasers of the type described do not require feedback from reflectors. Plane reflector 17 is used primarily to redirect radiation emitted opposite to the desired output direction.

From source 11, as described, the radiation typically has a wavelength of 3,371 A in the ultraviolet range. The trigger pulse repetition rate from trigger generator 15 is normally continuously variable from a single pulse to a maximum of 100 pulses per second. The molecular nitrogen plasma may be excited with 15 to 20 kilovolt pulses from generator 13 typically of submicrosecond duration. With electrodes 14 and 16 approximately 1 meter in length and spaced approximately 5 centimeters apart, and with operating nitrogen pressures of 15–25 torrs, the peak power from the laser can be made to be in the area of 50 to 100 kilowatts with an effective pulse width as short as 10 nanoseconds. The transverse discharge of the pulsed nitrogen laser in this case provides a rectangular output beam of approximately 5 centimeters by 0.5 centimeters. This beam facilitates focusing and aperturing thereof to produce the variable rectangular beam of uniform intensity at sample 12.

Coherent radiation from source 11 is not essential for the purposes of our invention, neither is the rectangular output beam, though both characteristics are certainly preferable. Any intense source of radiation can be used provided first it can produce a sufficient pump intensity at the sample being studied to exceed the threshold for amplified emission, assuming such a threshold reasonably exists, and, second, the photon energy of the radiation from the source exceeds the excitation energy of the center responsible for the laser, typically the bandgap energy in solid materials. Pump intensities in excess of 10 megawatts per centimeter squared distributed over an area of approximately 1 millimeter in length with an arbitrary transverse dimension at sample 12 and wavelengths in the ultraviolet range are suitable for a large variety of materials. Sources with other than rectangular output beams are less desirable since they require rather complicated focusing and aperturing procedures to produce the variable rectangular beams with uniform intensity at the sample being studied.

Also in FIG. 1, the cylindrical lens 20, disposed in the path of the output beam from source 11, focuses the beam to a thin rectangular area at its focal plane orthogonal to the plane of the paper and indicated by dotted line A—B on the drawing. This is done to concentrate the beam and to provide a substantially uniform intensity throughout its rectangular cross section. Variable attenuator 21 is then situated between the cylindrical lens 20 and the focal plane A—B and used to control the intensity of the pumping radiation. Variable aperture 22 is positioned at the focal plane A—B to limit the cross-sectional length of the beam. The image formed by the cylindrical lens 20 and aperture 22 may be then refocused in sample 12 by a lens 23 with appropriate reducing optics. In this illustrated configuration, the length, $l$, of the excited region in sample 12 is varied in direct proportion to $l'$, the cross-sectional length of the aperture 22.

Beam length sensor 24 may be used to detect the length, $l$, of the beam on sample 12. It typically includes micrometer 25 connected to the adjustable portion of variable aperture 22. The indicator of micrometer 25 is then connected to potentiometer 26 as shown to produce a signal in proportion to the aperture length, $l'$, and therefore the beam length $l$, on the sample 12. This signal is then connected to recorder 27, illustratively a suitably calibrated X-Y recorder.

The intensity of the pumping radiation from source 11 may be monitored, to determine the effect of the pump intensity on the results of the test, by using beam intensity sensor 40 suitable for the particular wavelength generated by source 11. For example, it might include beam splitter 41, lens 42, and silicon photodiode 43. The output from photodiode 43 is averaged using gated amplifier 44 and connected to recorder 27.

The single-pass luminescent output from the edge of sample 12 passes through aperture 30 to insure that the radiation detected had passed directly through the excited volume in the sample and is received by detector 31. Detector 31 may be any one of a number of suitable radiation detectors, the particular type employed depending primarily on the type of material being tested. It could include lens 32 to focus the radiation from sample 12 onto the entrance slit of spectrometer 33. Photomultiplier tube 34, typically with a high gain and short response time, then detects the intensity of the emitted radiation from the spectrometer 33 and sends its proportional signal to the amplifier 35 which may comprise a fast logarithmic amplifier to enable detection of signals over a wide dynamic range in combination with a gated amplifier used to average the signals received. Output signals from the detector 31 are connected to recorder 27.

Sample 12 to be tested may comprise any material provided a sufficient density of excitable centers therein can be pumped to produce a reasonably detectable output. The method herein described is highly desirable for testing most solid materials because of their relatively high gain, high density, and hence low beam penetration depths. The penetration depth of the pumping beam in the material depends primarily on the density of the material being pumped. The preferred materials for testing include semiconductors and insulators, pure or doped, and metals. Some liquids and other solutions and high density, high pressure gases or vapors may also be tested using appropriate containers or cells that allow the incidence of the pumping beam on the sample and the emission of the radiation from the excited volume. Suitable detecting means would also have to be provided for the liquid and gaseous samples.

Sample 12 may be of arbitrary shape and dimensions, preferably with at least one substantially smooth surface. What constitutes a substantially smooth surface varies with the material being tested, but, in general, is one in which the maximum amplitude of irregularities in the surface is substantially less than the penetration depth of the pumping beam. Solid materials may be appropriately cleaved in order to establish a suitable smooth face before testing. Normally, little or no fabrication of the solid materials is required.

A cooling apparatus (not shown) may also be included in the illustration of FIG. 1 to cool the solid samples to be tested, preferably to low Kelvin temperatures, i.e., 2°K. Typically, it would include one or more cold fingers on a lateral surface of sample 12 or an appropriately adapted immersion dewar.

Broadly, the method which comprises our invention is summarized in the block diagram of FIG. 2 and is useful in determining the presence of stimulated emission in suitable materials. It involves comparing the intensity of the luminescent output from an edge of the excited volume of variable length, $l$, in the sample being tested, for various values of $l$. Provided the intensity of the output varies as an increasing exponential function of the length, an excess of gain over loss is being obtained.

An alternative method useful for determining the net gain for suitable materials involves plotting the logarithm of the intensity of the output radiation from the sample being tested, at selected wavelengths, as a function of the length, $l$, of the excited volume. Suitable wavelengths for testing may be selected by scanning the output spectrum from the sample at an arbitrary excitation length and determining the wavelengths at which peak output occurs. Provided there is an excess of gain over loss, there will be a portion of the resulting plot which shows a substantially linear increase. The slope of this linear region determines the net gain being obtained at the selected wavelength.

In order to explain the principles of our invention, reference is made to FIG. 3 in which an excited volume of the sample 12 with spontaneous emission occurring uniformly therein is considered. A straightforward calculation shows that if the net gain experienced by the pump radiation is given by $$g = g' - \alpha \quad (1)$$

where $g$ is the net gain coefficient, $g'$ is the gain coefficient due to stimulated emission, and $\alpha$ is the optical loss coefficient, all typically with dimensions centimeters$^{-1}$, then the detected single-pass output intensity, $I_0(l)$, at a particular wavelength amplified along the length, $l$, is given by $$I_0(l) = (I_S A/g)[\exp(gl) - 1] \quad (2)$$

where $I_S$ is the spontaneous emission rate per unit volume from the excited material, and $A$ is the cross-sectional area of the excited volume at the output edge, illustratively shown as a rectangle in FIG. 3. In general, the shape of the area, $A$, depends on several factors and may vary with different materials and different pumping beam characteristics. Aperture 30 is also shown in FIG. 3 with an opening corresponding to the area, $A$, and positioned to pass only the radiation emitted along the length, $l$, of the excited volume.

From equation 2, it is clear that observation of an exponential increase in the intensity of the output radiation from the excited volume of sample 12, as the excitation length, $l$, is varied, is a direct indication of the existence of an excess of gain over loss. It is also clear that the region of substantially linear variation in a log $I_0$ versus $l$ plot determined in the alternative method of our invention corresponds to values of $l$ large enough for the exponential factor in equation 2 to dominate over the unity factor therein. In such a region, $g$, the net gain coefficient, can be determined directly from the slope of the curve.

The above-described technique has been applied to cadmium sulfide (CdS), a semiconductor material with laser capabilities previously established and net gain measurements made by other techniques in the prior art. The apparatus employed was practically identical to that illustrated in FIG. 1, the pump intensity being attenuated by the use of neutral density filters, while the excitation length was varied by means of a variable aperture as shown. Crystalline samples of CdS were mounted in an immersion dewar and maintained at 2°K.

The spectral distribution of the detected output radiation for various values of the excitation length for fixed pump intensity, i.e., 6 megawatts per centimeter squared, is shown in FIG. 4. In FIG. 4 the broadband emission in the spectral range from 4,900 to 4,930 A experienced the greatest increase as the length of the excited region of the sample was increased. This emission band dominated the stimulated emission over the range of pump intensity investigated. For the purposes of illustrating the net gain determination technique of our invention, attention was focused on the emission at 4,907 A. This wavelength lies near the lasing wavelength measured by prior art techniques for a number of lasers prepared from CdS.

Figure 5:
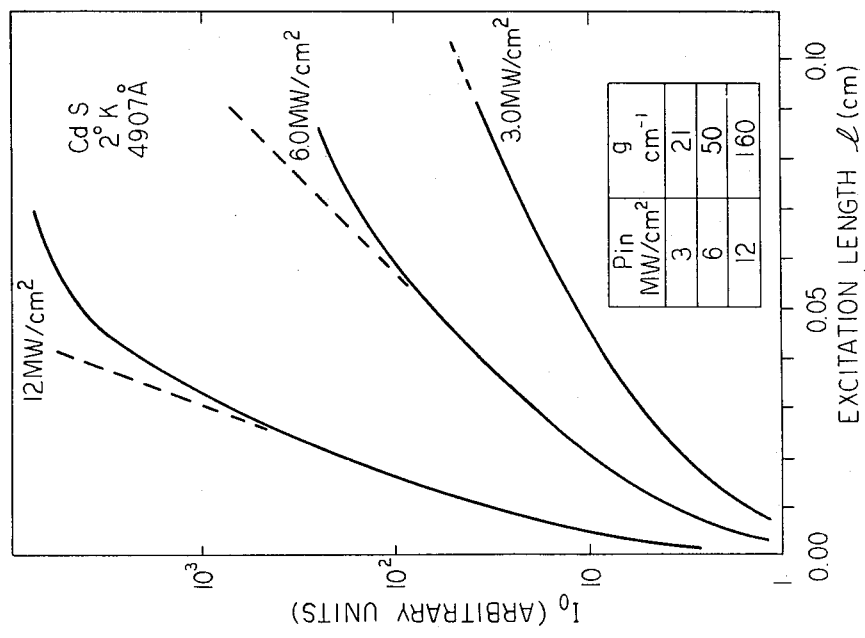
FIG. 5 illustrates a plot of the intensity of the luminescent output versus the excitation length, $l$, for cadmium sulfide from which plot the net gain for cadmium sulfide is determined.

FIG. 5 shows the variation of the output intensity at 4,907 A from the CdS samples with increasing excitation length. The results for three pump intensities are shown, i.e., $P_{in} = 3$, 6, and 9 megawatts per centimeter squared.

The initial portions of these curves, at small values of the excitation length, are regions in which the exponential factor in equation 2 does not dominate the unity factor therein and are therefore nonlinear. Regions of linear variation on the curves are eventually reached, as the excitation length is increased, and it is from the slope of these regions that the net gain is calculated. The dotted lines indicated on the curves in the drawing show these linear regions and the slopes used to determine the net gain in each case. As the excitation length increases further, it is noted that the gain increases at a lesser rate and the curves are again nonlinear. This is due to saturation, and occurs when the level of amplified radiation in the excited volume is great enough to delete a significant fraction of the excited states. Since increasing the length of the excited volume at saturation can do no more than linearly increase the number of excitable centers available, the output radiation approaches a linear variation with excitation length and therefore appears non-linear on the logarithmic plots shown.

The net gains for each pump intensity, as determined from the method of our invention, are summarized in the table in FIG. 5. Good agreement with prior art experiments for determining the net gain in CdS was found.

Additionally, it has been shown by the technique of our invention that cuprous chloride (CuCl), a semiconductor material in which no previous determination of optical gain has been made, is capable of stimulated emission with a relatively high net gain. Using apparatus practically identical to that described in FIG. 1, crystalline samples of CuCl at 2°K were tested.

FIG. 6 shows the net gain results for the CuCl samples at 3,915 A. Three different pump intensities are shown including $P_{in} = 5$, 10 and 20 megawatts per centimeter squared. It is noted that the curves are substantially linear at relatively low excitation lengths. This is due to the relatively high net gain in CuCl causing the exponential in equation 2 to dominate at low lengths. The slopes from which the net gain was determined are indicated for each curve by the dotted lines. Saturation at large excitation lengths, especially in the high pump intensity and high gain curves, is clear. The table in FIG. 6 summarizes the results for the CuCl.

It is understood that the above-described apparatus of FIG. 1 is illustrative of the application and execution of a preferred method of our invention, and especially suitable for the testing of solid materials. Numerous other arrangements may be made by those skilled in the art without departing from the basic principles and scope of our invention.

I claim:

1. A method of determining the presence of stimulated emission in materials for lasers comprising the steps of:

pumping a substantially smooth surface of a sample of the material with a beam of electromagnetic radiation to excite a volume therein having at least one dimension of length, $l$;

measuring the intensity of the luminescent output emitted along the direction of the length, $l$, and from an edge of said excited volume;

varying the length, $l$, of said excited volume;

comparing said intensity at the various lengths; and determining whether said intensity varies approximately as an increasing exponential function of said length, the presence of said exponential increase indicating the presence of stimulated emission for the pumping radiation in the sample.

2. A method according to claim 1 in which said pumping step includes the steps of:

focusing said beam of radiation into a beam having a substantially rectangular cross section with one dimension of the length, $l$, and with the other dimension of an arbitrary length; and directing said beam to have the length, $l$, terminate at an edge of said surface of the sample.

3. A method according to claim 1 in which said pumping step further comprises supplying electromagnetic radiation having photon energy exceeding the excitation energy of the center responsible for lasing in the material and with an intensity exceeding the expected threshold intensity of the material for stimulated emission.

4. A method according to claim 1 in which the material to be tested is a solid material selected from the group consisting of semiconductors, insulators and metals and in which said pumping step includes the steps of:

scribing said surface of said sample in a selected region thereof to produce a groove therein;

focusing said beam of radiation into a beam having a substantially rectangular cross section with one dimension of the length, $l$, and with the other dimension of an arbitrary length;

directing said beam to have the length, $l$, terminate at an edge of said groove; and coupling said luminescent output out of said surface at said groove.

5. A method of measuring the net gain in materials for lasers comprising the steps of:

pumping a substantially smooth surface of a sample of the material with a beam of electromagnetic radiation to excite a volume therein having at least one dimension of length, $l$;

measuring the intensity of the luminescent output emitted along the direction of the length, $l$, and from an edge of said excited volume;

varying the length, $l$, of said excited volume;

comparing the logarithm of said intensity at the various lengths; and determining whether the logarithm of said intensity increases linearly with said length in a suitable range of said lengths, the rate of said linear increase being directly related to the net gain for the pumping radiation in the sample.

6. A method according to claim 5 in which said pumping step includes the steps of:

focusing said beam of radiation into a beam having a substantially rectangular cross section with one dimension of the length, $l$, and with the other dimension of an arbitrary length; and directing said beam to have the length, $l$, terminate at an edge of said surface of the sample.

7. A method according to claim 5 in which said pumping step further comprises supplying electromagnetic radiation having photon energy exceeding the excitation energy of the center responsible for lasing in the material and with an intensity exceeding the expected threshold intensity of the material for stimulated emission.

8. A method according to claim 5 in which the material to be tested is a solid material selected from the group consisting of semiconductors, insulators and metals and in which said pumping step includes the steps of:

scribing said surface of said sample in a selected region thereof to produce a groove therein;

focusing said beam of radiation into a beam having a substantially rectangular cross section with one dimension of the length, $l$, and with the other dimension of an arbitrary length;

directing said beam to have the length, $l$, terminate at an edge of said groove; and coupling said luminescent output out of said surface at said groove.

* * * * *